(12) United States Patent
Gossel et al.

(10) Patent No.: US 8,458,180 B2
(45) Date of Patent: Jun. 4, 2013

(54) INFORMATION EXPLORATION

(75) Inventors: Philip Charles Gossel, Stroud (GB); Richard Harper, Cambridge (GB); Richard Banks, Egham (GB)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 12/771,140

(22) Filed: Apr. 30, 2010

(65) Prior Publication Data

US 2011/0270816 A1 Nov. 3, 2011

(51) Int. Cl.
G06F 7/00 (2006.01)
G06F 17/30 (2006.01)

(52) U.S. Cl.
USPC .......................................................... 707/737

(58) Field of Classification Search
None
See application file for complete search history.

(56) References Cited

U.S. PATENT DOCUMENTS

| | | | | | |
|---|---|---|---|---|---|
| 5,675,788 | A | * | 10/1997 | Husick et al. ......................... | 1/1 |
| 6,006,225 | A | * | 12/1999 | Bowman et al. ...................... | 1/1 |
| 6,772,150 | B1 | * | 8/2004 | Whitman et al. .............. | 707/721 |
| 6,847,977 | B2 | * | 1/2005 | Abajian ........................ | 709/223 |
| 2008/0201326 | A1 | | 8/2008 | Cotter et al. | |
| 2009/0265760 | A1 | | 10/2009 | Zhu et al. | |

OTHER PUBLICATIONS

Kuwabara et al., "Query Relaxation and Answer Integration for Cross-Media Meat-Searches", IEEE International Conference on Multimedia and Expo, pp. 309-312, IEEE, 2004.*

Teevan et al., "Personalizing Search via Automated Analysis of Interests and Activities", SIGIR '05, pp. 449-456, ACM 2005.*

Kuwabara et al., "RelaxImage: A Cross-Media Meta-Search Engine for Searching Images for Web Based on Query Relaxation", Proceedings of the 21st International Conference on Data Engineering, pp. 1102-1103, IEEE, 2005.*

Jones, "Adaptive Systems for Multimedia Information Retrieval", AMR 2003, LNCS 3094, pp. 1-18, 2004, Springer-Verlag Berlin Heidelberg.*

Akhouri, "Mash it up for a better user experience", retrieved on Apr. 7, 2010 at <<http://www.expresscomputeronline.com/20081229/buzzaroundtechnology05.shtml>>, Indian Express Newspapers (Mumbai), Dec. 29, 2008, pp. 1-5.

Makela, Viljanen, Alm, Tuominen, Valkeapaa, Kauppinen, Kurki, Sinkkila, Kansala, Lindroos, Suominen, Ruotsalo, Hyvonen, "Enabling the Semantic Web with Ready-to-Use Mash-Up Components", retrieved on Apr. 6, 2010 at <<http://kauppinen.net/tomi/mashup-ontology-services-iswc-2007.pdf>>, First Industrial Results of Semantic Technologies, Nov. 15, 2007, pp. 1-14.

(Continued)

Primary Examiner — Michael Hicks
(74) Attorney, Agent, or Firm — Zete Law, P.L.L.C.; MacLane C. Key

(57) ABSTRACT

Information exploration is described. For example, a user provides gathering terms to an information exploration system which uses those terms to generate many composite items formed from content of different media types obtained from a web search engine. For example, the composite items are displayed simultaneously on a user interface and provide a user with a partial map of information "territory" accessible through the system. In some examples the user is able to select a composite item and use it to explore further in the same direction by generating more composite items using related gathering terms. In some examples the user is able to select a composite item and use it to explore further in a manner indirectly related to the selected composite item. In examples the composite items may be saved in scrap books, sent to other users or used to access content.

19 Claims, 12 Drawing Sheets

OTHER PUBLICATIONS

Makki, Sangtani, "Data Mashups and Their Applications in Enterprises", retrieved on Apr. 7, 2010 at <<http://ieeexplore.ieee.org/stamp/stamp.jsp?tp=&arnumber=4545653>>, IEEE Computer Society, Conference on Internet and Web Applications and Services, Jun. 20, 2008, pp. 445-450.

Spoerri, "Visual Mashup of Text and Media Search Results", retrieved on Apr. 6, 2010 at <<http://comminfo.rutgers.edu/~aspoerri/Publications/ICIV2007public.pdf>>, Conference on Information Visualization, Jul. 6, 2007, pp. 1-6.

Thor, Aumueller, Rahm, "Data Integration Support for Mashups", retrieved on Apr. 6, 2010 at <<http://dbs.uni-leipzig.de/file/IIWeb2007_final.pdf>>, Association for the Advancement of Artificial Intelligence, Apr. 30, 2007, pp. 1-6.

"What is Echoes", retrieved on Apr. 7, 2010 at <<http://echoes.kazulo.com/7452/what-is-echoes.htm>>, 2010, pp. 1.

\* cited by examiner

INFORMATION EXPLORATION

BACKGROUND

Users have a desire to explore information available on the internet or from other sources for many purposes, including for example, to obtain a general "sense" of the information that is potentially available. However, existing search engine designs presume that users know what they are seeking and if they do not, supports browsing activities that leads users to a better understanding of what they might seek and hence back to search again. Search and browsing typically entails offering 'hits' to a user that they can confirm or decline as right or wrong as part of this overall process. Some techniques exist for the automatic reorganization and filtering of search results in order to allow the user to more quickly and accurately have access to information that they need.

An example of a technique which allows a user to gain a broader sense of what information is available than using just one search engine is a meta-search engine. A meta-search engine is a search tool that sends user requests to several other search engines and/or databases and aggregates the results into a single list or displays them according to their source. Meta-search engines enable users to enter search criteria once and access several search engines simultaneously. Meta-search engines operate on the premise that more comprehensive search results can be obtained by combining the results from several search engines. This also may save the user from having to use multiple search engines separately. However, users may not wish to access a specific result but may wish to gain a general sense of what information is available.

Searching and browsing are not the only activities that users might want to undertake when they engage with web content. They may not wish to be presented with hits before they have a developed sense of what may be available and may find that they need assistance in their information exploration without wanting to commit to a target for selection. Users need tools to make their understanding of web content richer and more creative. They may also wish to gather some of the content they find and use it in more orthodox search activities.

The examples described below are not limited to implementations which solve any or all of the disadvantages of known information exploration systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Information exploration is described. For example, a user provides gathering terms to an information exploration system which uses those terms to generate many composite items formed from content of different media types obtained from a web search engine. For example, the composite items are displayed simultaneously on a user interface and provide a user with a partial map of information "territory" accessible through the system. In some examples the user is able to select a composite item and use it to explore further in the same direction by generating more composite items using related gathering terms. In some examples the user is able to select a composite item and use it to explore further in a manner indirectly related to the selected composite item. In examples the composite items may be saved in digital scrap books, sent to other users or used to access content.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a web search system, the system described is provided as an example and not a limitation. As those skilled in the art will appreciate, the present examples are suitable for application in a variety of different types of information exploration systems.

Figure 1:
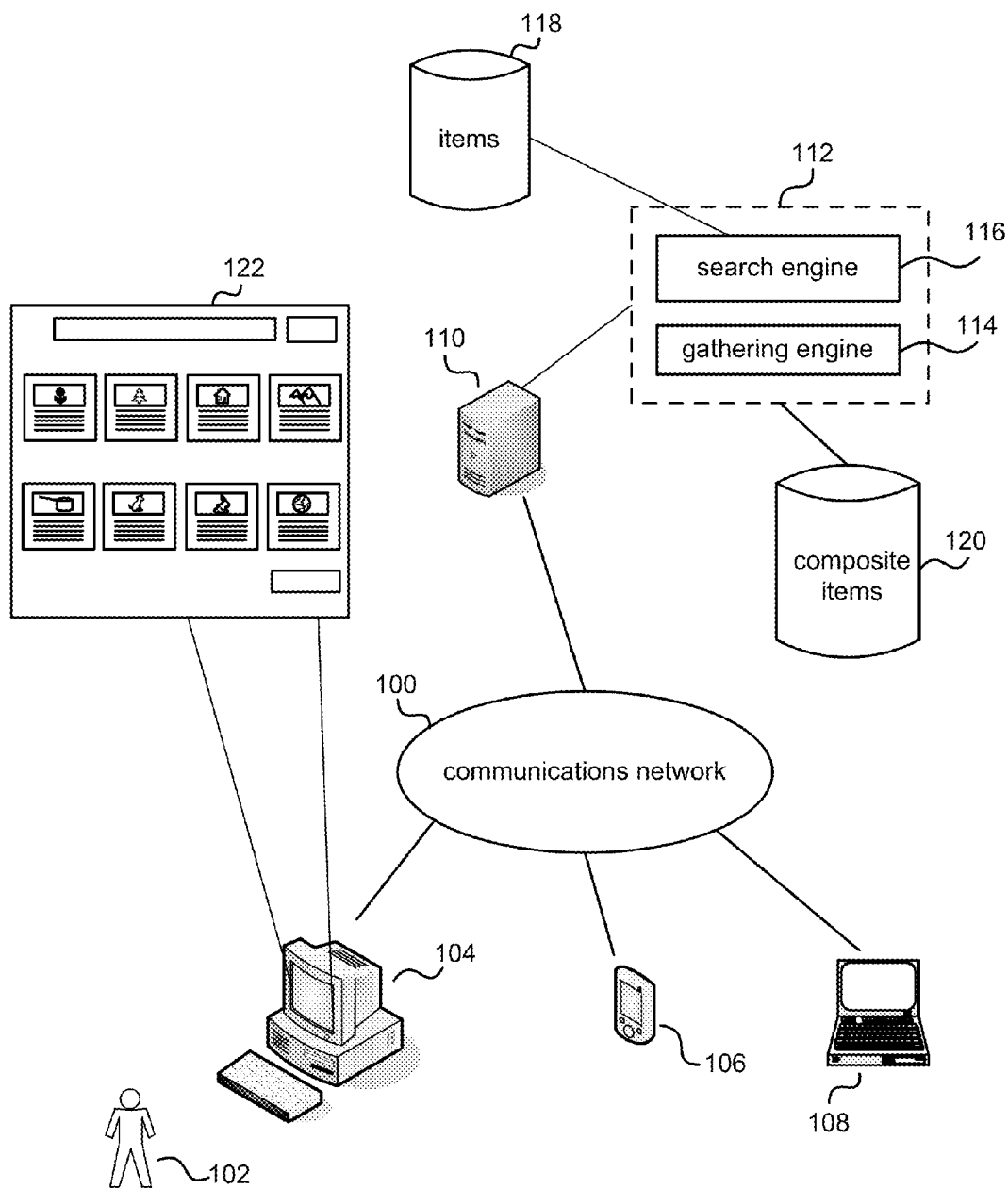
FIG. 1 is a schematic diagram of an information exploration system.

FIG. 1 is a schematic diagram of a computer-implemented information exploration system connected to a communications network 100 at a location remote from end users. A user 102 may wish to explore information based on an initial query using a PC 104, PDA 106, laptop 108 or any device suitable for communicating with the information exploration system and displaying content. Implemented at a content server 110 there is an information exploration system 112 which comprises a gathering engine 114 and a search engine 116. Users 102 who may be human users or automated users are able to interact with the information exploration system 112 in any suitable manner, such as using a web-based user interface, in order to voyage or explore information available through the information exploration system 112. For example, the search engine 116 is arranged to retrieve items 118 which may be any of documents, web pages, images, audio files, blogs, SMS messages, emails, voice mails, books, audio books, SMS feeds or other information. The gathering engine is arranged to create a plurality of composite items each comprising content of at least two different media types. The composite items may then be displayed at a user interface 122 on a display of any suitable type. By creating and presenting many composite items in this way a user is given a general "sense" of the type and range of information available and is able to voyage and explore the items 118.

The communications network 100 may be any appropriate network. A non exhaustive list of examples of appropriate networks is: Local Area Networks (LAN), Wide Area Networks (WAN), Public Switched Telephone Networks (PSTN), the Internet and Virtual Private Networks (VPN). The network 100 may be a wireless network or a wired network or combinations thereof. The user may use a PC 104, PDA 106, laptop 108 or other device to access the communication network 100 and the information exploration system 112. The communication devices shown in FIG. 1 are intended as examples only. The user may also use a netbook, tablet PC, smartphone or any other appropriate device to access the communications network 100. The server 110 may be a dedicated server or a shared server. The server may be a single device or a plurality of devices. The server may be located in a data centre. Implemented at the server is an information exploration system 104. Any appropriate method of accessing the information exploration system may be used. For example the user can access the information exploration system using a webpage. The information exploration system comprises a gathering engine 114 and a search engine 116. In an example the gathering engine 114 and at least one search engine 116 are co-located at the server 112. In alternative example the gathering engine is located at an intermediate location in the communications network 100.

In an example, the user 102 inputs information to the gathering engine 114. The phrase "gathering terms" is used herein to describe information input by the user to the gathering engine. For example, the gathering terms may be key words, phrases, example items or parts of items such as images, emails, SMS messages or other items. The gathering engine 114 uses the gathering terms to form a query which it submits to the search engine 116. For example, the query may comprise all of the gathering terms input by the user or a subset of the gathering terms. The search engine returns search results in response to the query. The search results are provided in any suitable format and each search result refers or points to an item 118. A non-exhaustive list of possible types of items 118 that may be listed by the search engine is text files, image files, video files, sound files, information retrieved from social media, news headlines, documents, emails, SMS messages, email threads, voice mails, books, audio books, SMS feeds or any other appropriate type of information. Optionally a further search of the original query or new or additional queries based on the originally returned results can be carried out by the search engine 116.

In some examples a single search engine 116 is used which is able to retrieve results of a plurality of different media types. In this case the gathering engine may filter the results it receives by media type. In other examples the gathering engine may modify the queries it issues in order to ensure that it receives results of a particular media type. In other examples, a plurality of search engines are used with each search engine retrieving results of a particular media type (for example, one search engine for images and one for documents).

The phrase "content item" is used herein to refer to a piece of information of a single media type such as a video clip, digital image, email, text document, web page, audio clip, SMS message, or other. For example, it may be obtained from a search result returned by the search engine. In some embodiments the search results comprise a hyper link to a web page together with text describing the linked web page. For example, the content item may be the text describing the linked web page that is part of the search result itself. In other examples, the content item is obtained by accessing the web page and taking part or all of the content from that document. The gathering engine 114 creates composite items. This is achieved by combining two or more content items. At least two of the content items in the composite are of different media types.

Figure 2:
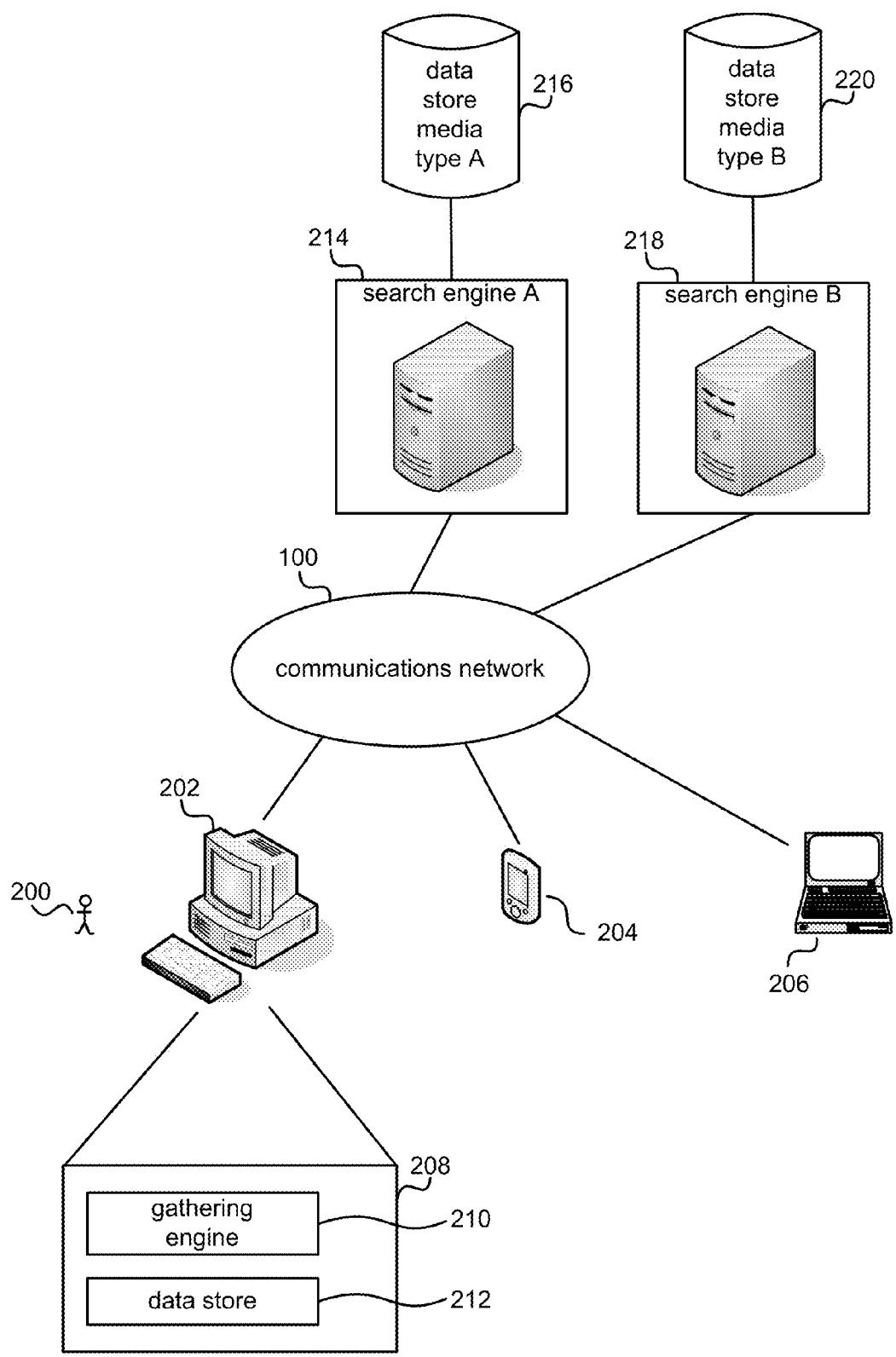
FIG. 2 is a schematic diagram of another embodiment of an information exploration system.

In another example the gathering engine is implemented on a device local to the user as illustrated in FIG. 2. A user 200 (human or automated) is able to access one or more search engines 214, 218 over a communications network 100 using a PC 202, a PDA, 204 a laptop 206 or any other appropriate user device. The user device 208 is computer implemented and comprises a gathering engine 210 and a data store 212 for storing composite items created by the gathering engine 210.

The gathering engines of FIGS. 1 and 2 operate in a similar manner as described in more detail below.

In the example illustrated in FIG. 2 two search engines are illustrated. Search engine A is able to retrieve items of media type A from data store 216. Search engine B is able to retrieve items of a different media type from data store 220. In this way the gathering engine is able to retrieve search results of a particular media type according to which search engine it issues queries to. It is also possible to use more search engines, each dedicated to a particular media type or particular combination of media types. In addition, it is possible for the gathering engine to be implemented at a different location in the arrangement of FIG. 2.

Figure 3:
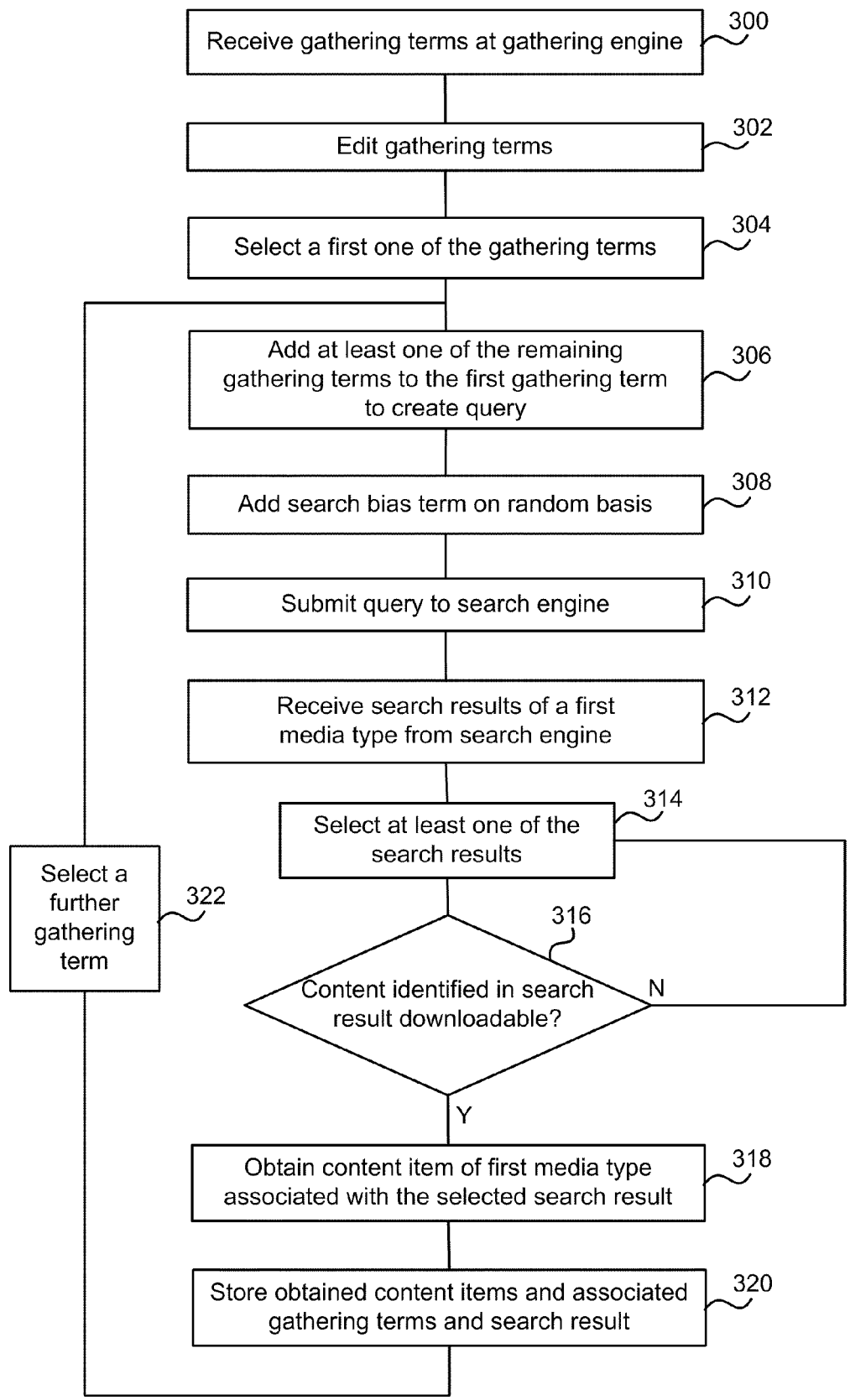
FIG. 3 is a flow diagram of a method at a gathering engine.

FIG. 3 is a flow diagram of an example method at a gathering engine. This method may be used to obtain a plurality of content items all of a particular media type. For example, to obtain 16 pieces of text. These content items may then be used to generate composite items as described with reference to FIG. 4 below.

With reference to FIG. 3 gathering terms are received 300 at the gathering engine and optionally edited 302. The gathering terms are used to create 16 (or any other suitable number) of queries which differ from each other. The queries are used to obtain content items of the same media type.

For example, a first gathering term is selected 304 and at least one of the remaining gathering terms is added 306 to the first gathering term to create a query. A search bias term is optionally added 308 on a random basis. For example, a pseudo random process may be used to decide, for each query, whether a search bias term is to be added. In other examples, a search bias term is added to every second or every third query (or other specified query interval). The query is submitted 310 to the search engine and search results are received 312 in reply. At least one of the search results is selected 314. This selection is achieved in any specified manner such as by taking the highest ranking search result. A check 316 is optionally made to find out whether content identified in the search result is downloadable. If the check 316 shows that the content is not downloadable then at least one further search result is selected 314 and the check 316 repeated. If the content is downloadable a content item of a first media type associated with the selected search result is obtained 318 and the obtained content item and associated gathering terms and search result are stored 320. This process is then repeated 322 for different queries formed from the gathering terms in order to create many content items.

For example, the gathering terms may have been "Laura's visit to Paris France". In this case the query may have been "Laura Paris" and one search result linking to a social networking site page for a person called "Laura Paris" may have been selected. In this example, the content item may be a text description of the social networking site page provided with the search result. The text description is then stored together with the gathering terms and the search result itself (comprising the link to the web page). Another gathering term is then selected, for example, "visit" and added to one of the remaining gathering terms to create another query which may be for example, "visit Laura". The process then repeats to create another content item and so on.

As mentioned above, the gathering terms are optionally edited 302. In an example editing 302 comprises removing common words from the terms received. A non-exhaustive list of examples of common words which may be removed are 'the', 'a', 'and', 'or' 'at', 'if', 'of'. The system may be arranged to dynamically detect common words and add these to the list of examples to be removed from the gathering terms. Editing may also comprise correcting spelling mistakes and any other appropriate procedures. In a further example editing may comprise formatting the input into a format that can be accepted by the search engine such as converting speech to text, compressing images to comply with size restrictions, converting a file format to one accepted by the search engine or any other appropriate process. Editing may be an automated process, may be directed by the user, or may be a combination thereof.

A first one of the gathering terms input by the user is selected 304. At least one of the remaining gathering terms is added 306 to the first gathering term to create a query. The gathering engine may combine the terms using any appropriate process. In an example every possible combination of gathering terms is used. For example where there are four terms there would be sixteen possible combinations. In a further example the terms may be randomly selected. In an example where there are a large number of gathering terms the user may not wish to see results based on every possible combination and only a subset may be used. In a further example the user may be able to select the amount of combinations of gathering terms to be used.

Search bias terms can optionally be added 308 to the query on a random basis. A non-exhaustive list of examples of search bias terms is the names of popular search engines, video or image hosting sites, information sites, news sites or social networking sites. In an example the gathering engine may comprise a machine learning module so that search bias terms are added to the query based on previous results the user has preferred. In another example the information exploration system may incorporate a recommender system based on comparing results the user has previously preferred with those of other users and basing future searches on the preferred results of those other users. In a further example search bias terms may be added to ensure that only search results of a specified media type are received. For example by adding search bias terms specifying that only a video-sharing site is searched. Any of the examples given above may be implemented separately or may be combined. Further search biasing techniques as known in the art may be implemented as appropriate.

As mentioned above, the query is submitted 310 to a search engine. The search engine may be integral with the gathering engine as described above at FIG. 1 or it may be remote from the gathering engine as described in FIG. 2.

The search engine is of any suitable type which can receive a query from the gathering engine and return search results which provide links to or addresses of items that are relevant to the query. For example, the search engine may be a web search engine which stores information about web pages that have been retrieved by a web crawler. Data about web pages can be stored in an index database for use in later queries. When the query is entered into a search engine, the engine may examine its index and a set of results are received 312 from the search engine according to search criteria. The index is built from information stored with the data and the method by which the information is indexed. A non-exhaustive list of examples which influence how data is indexed is merge factors, storage techniques, index size, lookup speed, fault tolerance and index architecture. However, any suitable form of search engine may be used.

At least one of the results received from the search engine is selected 314. The selection may be carried out using any appropriate criteria. An example of an appropriate method of selection is random selection. Another example of appropriate selection is a sequential selection. Any other appropriate method of selection may be used. In an example a filter may be applied to the results to ensure that only results of a certain media type are returned.

In an example the results received 312 from the search engine are based on the index database of the search engine. The information may comprise a cached version of the web page or other information. Since this information is not updated in real time the web page may no longer exist or the content may have been moved. There may be a need to verify the content. The gathering engine optionally carries out content checking 316 to check that content identified in a result is downloadable. The verification may be carried out using a link validator or checker or any other method known in the art. If the content checking 316 cannot verify that the content can be retrieved then a different result can be selected 314.

A content item of a first media type associated with the selected search result is obtained 318. In some examples this content item is obtained from the search results itself. For example, it may be text or other content that is provided by the search engine with the search result for display in the ranked list of search results. For example, it may be text describing a web page which is linked in a search result. In other examples the content item may be obtained from the cached version of the web page. In these cases, where the content item is obtained from the cached version of the web page or from the search result itself the checking step 316 may be omitted.

In other examples the content item is obtained by accessing a link provided in the selected search result. For example automated web-scraping can be used. A non-exhaustive list of examples of web-scraping techniques is: text grepping, regular expression matching, HTTP programming where static and dynamic web pages can be retrieved by posting HTTP requests to a remote web server using socket programming, Document Object Model (DOM) parsing, HTML parsers and semantic annotation recognizing.

The obtained content items and associated gathering terms and search results can be stored 320. A further gathering term is then selected 322 and the process of adding at least one of the remaining gathering terms to create a query, optionally adding a search bias on a random basis, submitting the query to the search engine, receiving the results, selecting the results, checking if the content is downloadable, obtaining and storing the content is repeated. In an example furthering gathering terms are selected 322 until all possible combinations of gathering terms have been used as queries. In an alternative example further gathering terms are selected 322 until a pre-specified number of queries have been submitted. In another example the user can select how many combinations of gathering terms to try. The stored content items can then by used to generate further queries in order to obtain associated items of a different media type.

Figure 4:
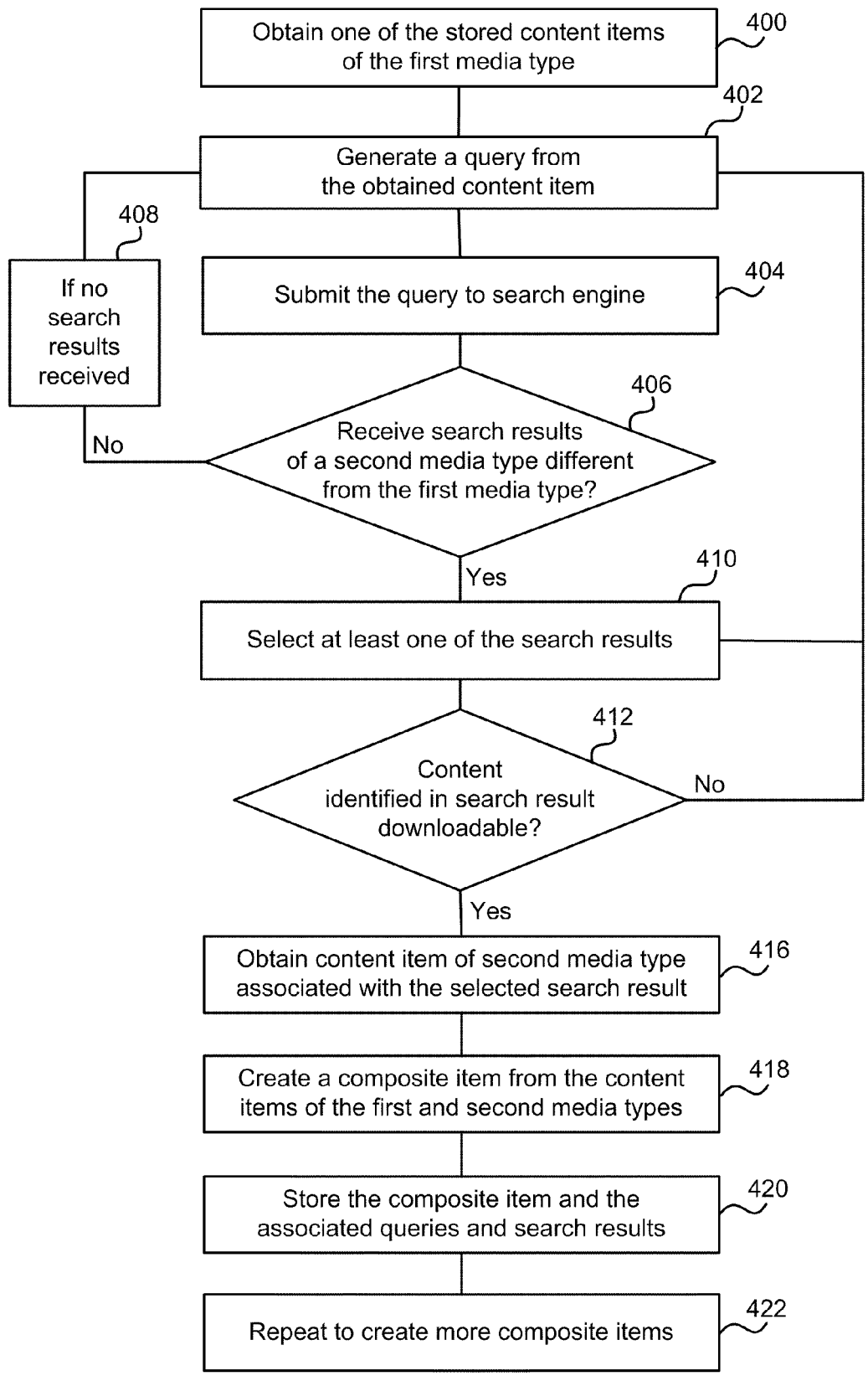
FIG. 4 is a flow diagram of generating a composite item at a gathering engine.

FIG. 4 is a flow diagram of using one of the content items obtained using the method of FIG. 3 to create a composite item. A stored content item of a first media type is obtained 400 and used to generate 402 a query. The query is submitted 404 to a search engine. Search results of a second media type are received 406. If no results are found 408 of a different media type to the first media type then a different query is generated 402. If a plurality of results are received 406 then at least one of the search results is selected 410 and optionally checked 412 to determine whether the content identified in the search result is downloadable. If the content is not downloadable then a different query can be generated 402. If the content identified is downloadable a content item of a second media type associated with the selected search result can be obtained 416. A composite item from the content items of the first and second media types is created 418 and the composite items and the associated queries and search results can be stored 420. The process may then be repeated 422 in order to create more composite items.

A query is generated 402 from the stored content item of the first media type. For example, if the content item obtained from the method of FIG. 3 is a piece of text, the query may comprise that text. In another example, if the content item obtained from the method of FIG. 3 is an image, the query may comprise that image and/or key words associated with the image. The query is optionally edited. The editing process may be of any suitable type as described above with reference to FIG. 3.

In an example the query may be generated at random from the stored content item or by any other appropriate means. In an alternative example the user may select a portion of the stored content item of the first media type to be used as a query. For example, if the stored content item is a piece of text, the user may select a portion of that to form the query.

Search bias terms may optionally be added to the query in a similar manner to that described above with reference to FIG. 3.

The query is submitted 404 to a search engine. The search engine may be the same search engine as used in the method of FIG. 3 or may be a different search engine. The search engine may be optimized to search for media of a specific type, for example the search engine can be an image search engine, or the search engine may be a general search engine which returns a plurality of different media types. A filter may be applied to the search results such that only search results of a specific media type are returned.

Search results of a second media type are received 406. If no search results are received 408 that are of a different media type to the first media type then a new query can optionally be generated from the obtained stored content items. The query may be generated from the same stored content item as the first query or a different stored content item. If the query is generated from a different content item the content may be of the same media type as the first stored content item or a different media type.

At least one of the results received from the search engine is selected 410 in a similar manner as described above with reference to FIG. 3.

The gathering engine optionally checks 412 that the content identified in the search result is downloadable. This may be achieved in a similar manner as described above with reference to FIG. 3.

As mentioned above, a content item is obtained 416 by the gathering engine. This content item is of a second media type, different from the first media type. The content item is obtained from the selected search result itself, from a cached web page for that search result, or from content obtained by accessing the web page of the search result. Any suitable process for obtaining the content may be used as described above with reference to FIG. 3.

A composite item is created 418 from the stored content items of the first and second media type where those media types are different from one another. For example the composite item may comprise a paragraph of text obtained from a search result received from a search engine based on the gathering terms input by the user and a video clip based on a query formed from the paragraph of text. The composite item and associated queries and search results can then be stored 420. The creation of a composite item can be repeated 422 a plurality of times. The creation of composite items can be carried out for all content items of a first media type stored in response to user input of specified gathering terms or a subset of the content items. In an example the number of composite items to be created can be determined automatically. In an alternative example the number of composite items can be specified by the user.

In an example, the gathering engine provides the plurality of composite items to a graphical user interface. For example, the composite items are displayed simultaneously in a single window or display region. In this way a user is provided with a general sense of the information available from the search engine in a manner not previously possible using conventional search engines.

Figure 5:
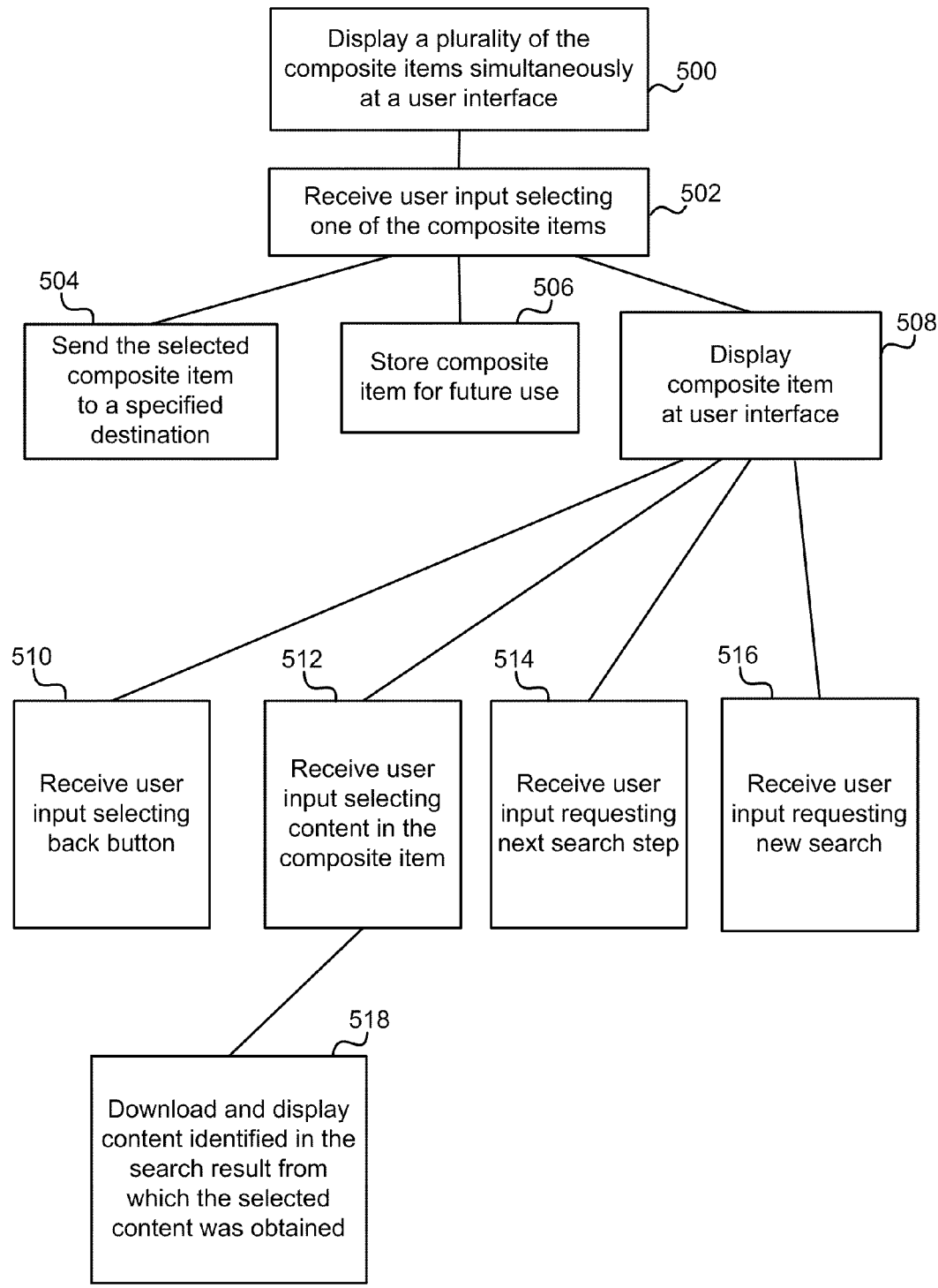
FIG. 5 is a flow diagram of interacting with composite items.

With reference to FIG. 5 a plurality of composite items can be displayed 500 on a graphical user interface. In an example a specified number of composite items can be displayed simultaneously. The number of items displayed can be fixed or may be adjustable by the user. In an alternative example the composite items may be displayed in another appropriate fashion. A non-exhaustive list of examples of means of presenting the information on the GUI is as a slide show or in a flip-book format.

User input is received 502 selecting one of the composite items. In an example the selected composite item can be resized such that it replaces the display of the plurality of composite items on the screen. In an example a variety of user inputs may be received specifying actions to be carried out on the composite item. For example, the user is able to send 504 the composite item to a specified destination. For example, by attaching the composite item to an email message or in any other suitable manner. In another example the user is able to store 506 the composite item for future use. For example, by dragging and dropping it into a digital scrapbook.

In the example described in FIG. 5 input can be received 510 from the user selecting the 'back' button to return to displaying a plurality of content items at the user interface. The user can select the content 512 in the composite item or request a next step 514 or new search 516. These options are provided as examples and are not intended as limitations. In an alternative example a plurality of different options may be provided to the user which may have the same or different functions. In an example when the user selects content 512 in the composite item they may be provided with a further option to download and/or display 518 content identified in the search result from which the selected content was obtained. For example the user may select text in a composite item and a further window at the GUI may display the webpage from which the text was extracted. In an alternative example the user may select a video clip and the original file may be downloaded for later viewing using a media player or displayed using a media streaming service.

Figure 6:
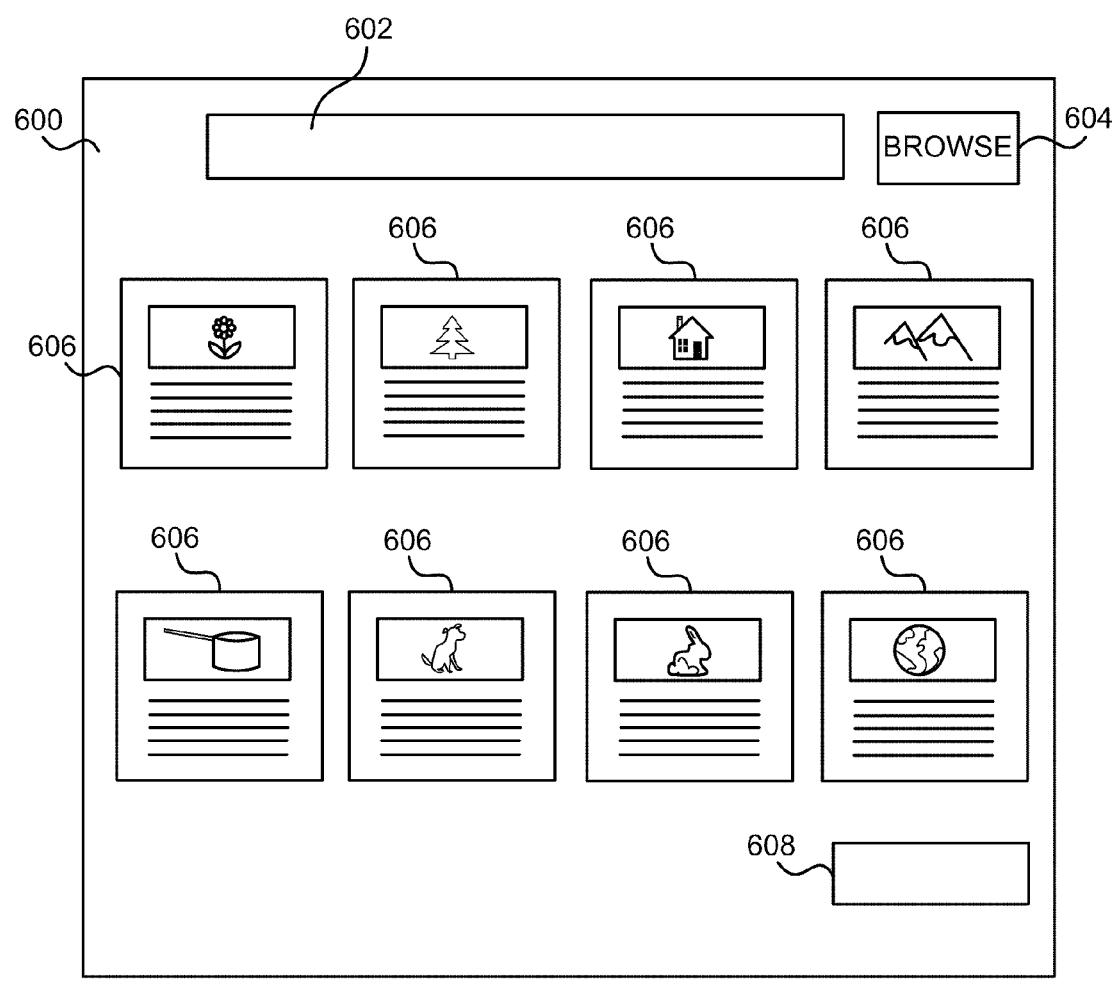
FIG. 6 is a schematic diagram of an example of a graphical user interface displaying a plurality of composite items.

FIG. 6 is a schematic diagram of an example of a Graphical User Interface (GUI) displaying composite items. The GUI 600 comprises a text entry box 602 into which a user can input gathering terms and a "browse" button 604. A plurality of composite items 606 are displayed at the GUI 600. The GUI may also comprise additional buttons or icons 608 to allow access to additional functions. The user can use the text entry box 602 to enter gathering terms. In an alternative example the text entry box may be replaced with an alternative method of submitting information. For example the text entry box 602 can be replaced or supplemented with the ability to upload data files. The "browse" button 604 is an example of icon at the GUI which can be used to initiate the processes described in FIG. 3 and FIG. 4 above. This is provided as an example and not a limitation. Any appropriate way of initiating the process can be used.

When the "browse" button is used by the user the processes described with respect to FIG. 3 and FIG. 4 above are initiated and a number of composite items 606 are returned. In the example shown in FIG. 6 eight composite items are shown. However, any number of composite items can be displayed. The number of composite items 606 displayed at the GUI may be fixed or may be variable. A non-exhaustive list of parameters that may change the number of composite items displayed is screen size or resolution, the types of composite items returned or a parameter adjustable by the user. Additional buttons or icons may be added to the GUI to provide further functionality. A non-exhaustive list of examples of additional icons that may be added is 'export', 'email', 'save', 'my favorites', 'trash'. The example described above is an example and not a limitation. Some or all of the elements above may be contained within the GUI and any other appropriate functionality may be added to the GUI.

Figure 7:
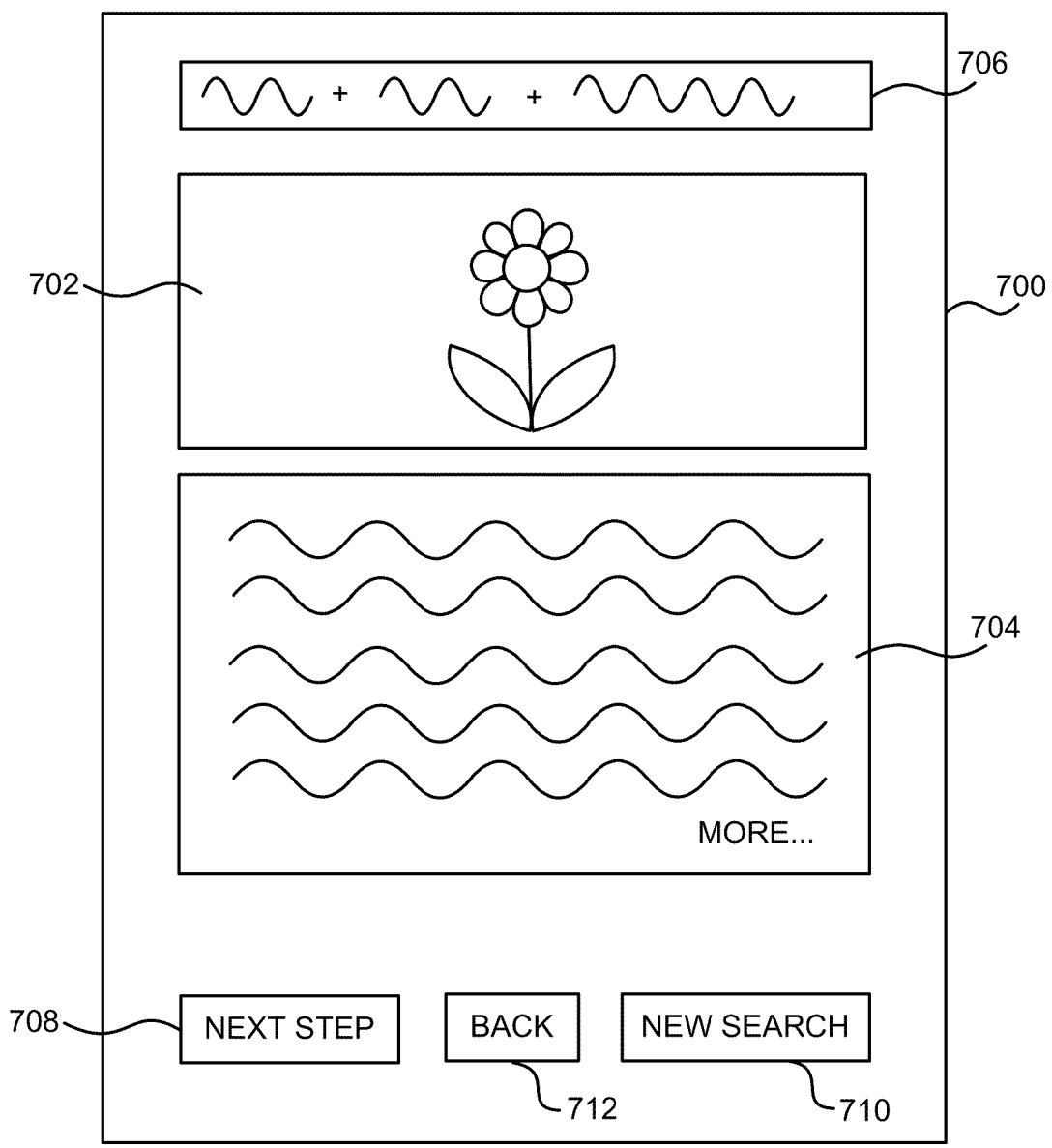
FIG. 7 is a schematic diagram of an example of a composite item.

FIG. 7 is a schematic diagram of an example of a composite item. The composite item 700 comprises at least a first 702 and a second 704 content item of different media types. The composite item may also include additional information such as a composite item identifier 706 which informs the user which combination of the original gathering terms input were used to form the query which returned the first content item 702. The first 702 and second 704 content items may be of any appropriate media types. A non-exhaustive list of types is: types is text, images, videos, audio files, data files, multimedia files, document, web page, email, email thread, SMS message, voice mail, or a combination thereof or any other appropriate media type. The first 702 and second 704 content items are of different media types.

The composite item may also include additional icons which incorporate additional functions. For example additional search functions. Examples of additional search functions are 'next step' 708 search or a 'new' search 710. A process for a next step search is described with reference to FIG. 8 below and a process for a new search is described with reference to FIG. 9 below. The composite item may also comprise additional functions. For example a back 712 icon which allows the user to return to the GUI display showing a plurality of composite items. Any other functions may be incorporated into the composite items as appropriate and the example described above with reference to FIG. 7 is intended to be a non-exhaustive example.

Figure 8:
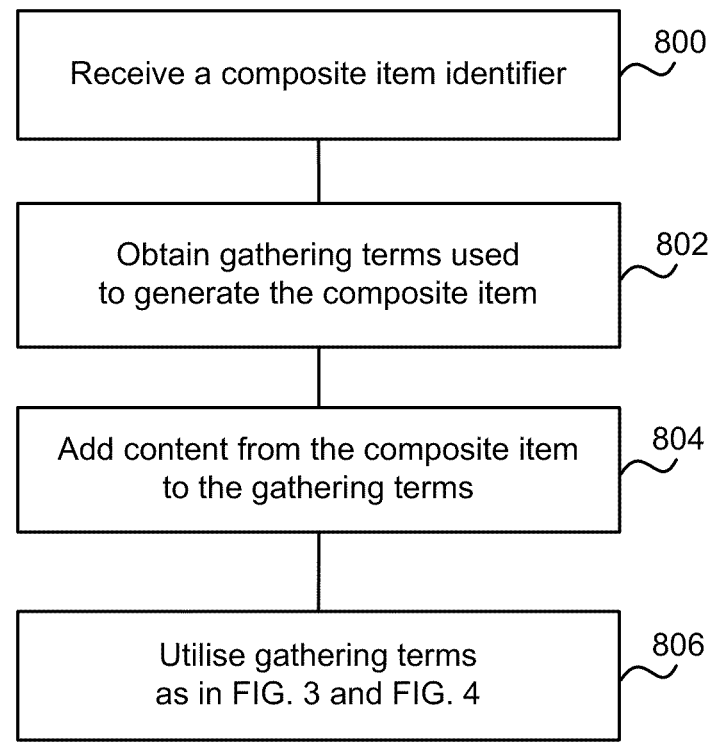
FIG. 8 is a flow diagram of retrieving content using gathering terms and additional content from a composite item according to a "next step search"

The "next step" search may comprise using the original gathering terms and additional content to return a new set of search results. FIG. 8 is a flow diagram of retrieving content using the original query terms and additional content from a composite item. A composite item identifier is received 800 and the original gathering terms used to generate the composite items are obtained 802. Content from the composite item is added 804 to the gathering terms to form a new set of gathering terms and the gathering terms are then utilized 806 as described above with reference to FIG. 3 and FIG. 4.

The composite item identifier may be a pointer to the stored composite item or an address of the composite item. Content from the composite item is added to the original gathering terms used to generate the composite item. In an example the content to be added is selected automatically from the media content in the composite item. In another example the content may be selected by the user. In yet another example the content may be an automated sample of a portion of the content selected by the user.

The content to be added may optionally be edited as described above with reference to FIG. 3.

Figure 9:
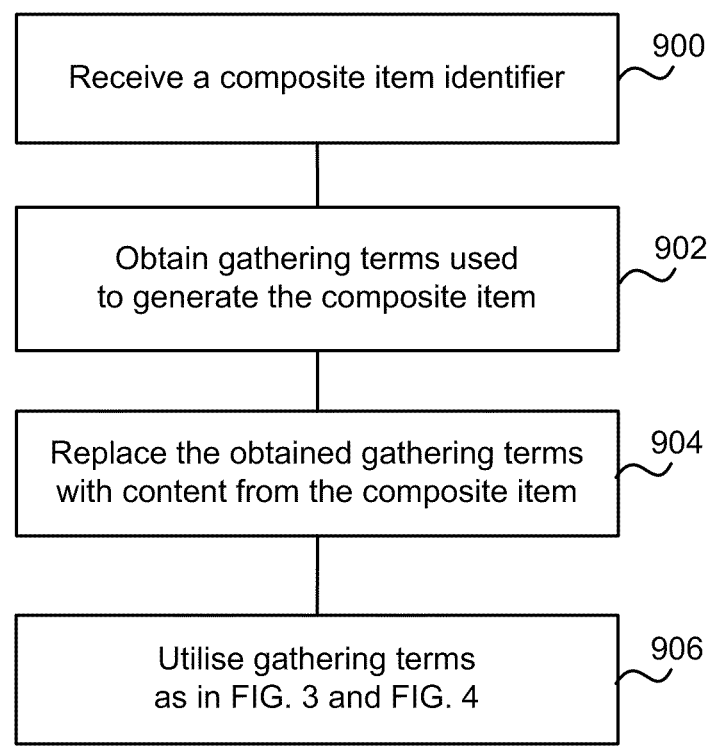
FIG. 9 is a flow diagram of a retrieving content by replacing the original gathering terms with new content from a composite item according to a "new" search.

With reference to FIG. 9 a "new" search may comprise replacing the original gathering terms with content extracted from a composite item. The new gathering terms are then used in the methods of FIGS. 3 and 4 to return a new set of composite items. A composite item identifier is received 900 and the original gathering terms used to generate the composite item are obtained 902. The obtained gathering terms are replaced 904 with content from the composite item to form a new set of gathering terms and the gathering terms are then utilized 906 as described above in FIGS. 3 and 4. In this way the results of the new search are only indirectly related to the original gathering terms and the user is able to explore or "voyage" the information territory of the search engine. By using either the new search or the next step search options a user is able to control the breadth of search or voyage. For example, by using the next step search the scope of search is narrower than for the new search option.

Content from the composite item replaces the original terms used. In an example the replacement content is selected automatically from the media content in the composite item. In another example the replacement content may be selected by the user. In yet another example the replacement content may be an automated sample of a portion of the content selected by the user.

The content to be added may be edited as described above with reference to FIGS. 3 and 4.

Figure 10:
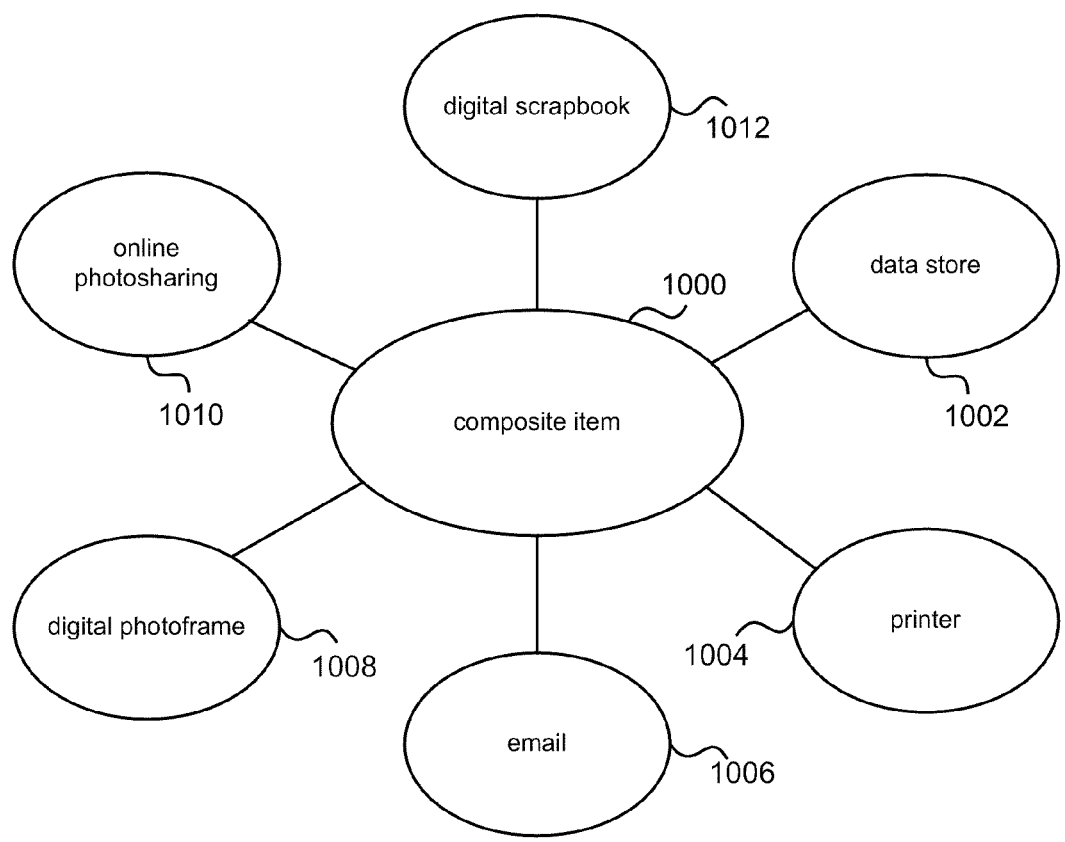
FIG. 10 is schematic diagram of exporting composite items.

FIG. 10 is schematic diagram of exporting composite items. In an example the user is able to export a composite item 1000 to a variety of different locations. A non-exhaustive list of examples of locations that composite items can be exported to is a data store 1002, a printer 1004, an email 1009, a digital photo-frame 1008, an online photo-sharing application 1010 or a digital scrap-book 1012. In an example the user may wish to export the composite item in order to use it at a later date. For example the user may wish to export the composite item in order to share the information with friends, family or colleagues. In a further example the user may wish to export the composite item in order to combine it with other information. In a still further example the user may wish to export the composite item in order to display the item on, in a non-exhaustive list of examples a digital photo-frame 1008, an online photo-sharing application, 1010 or a screensaver.

Figure 11:
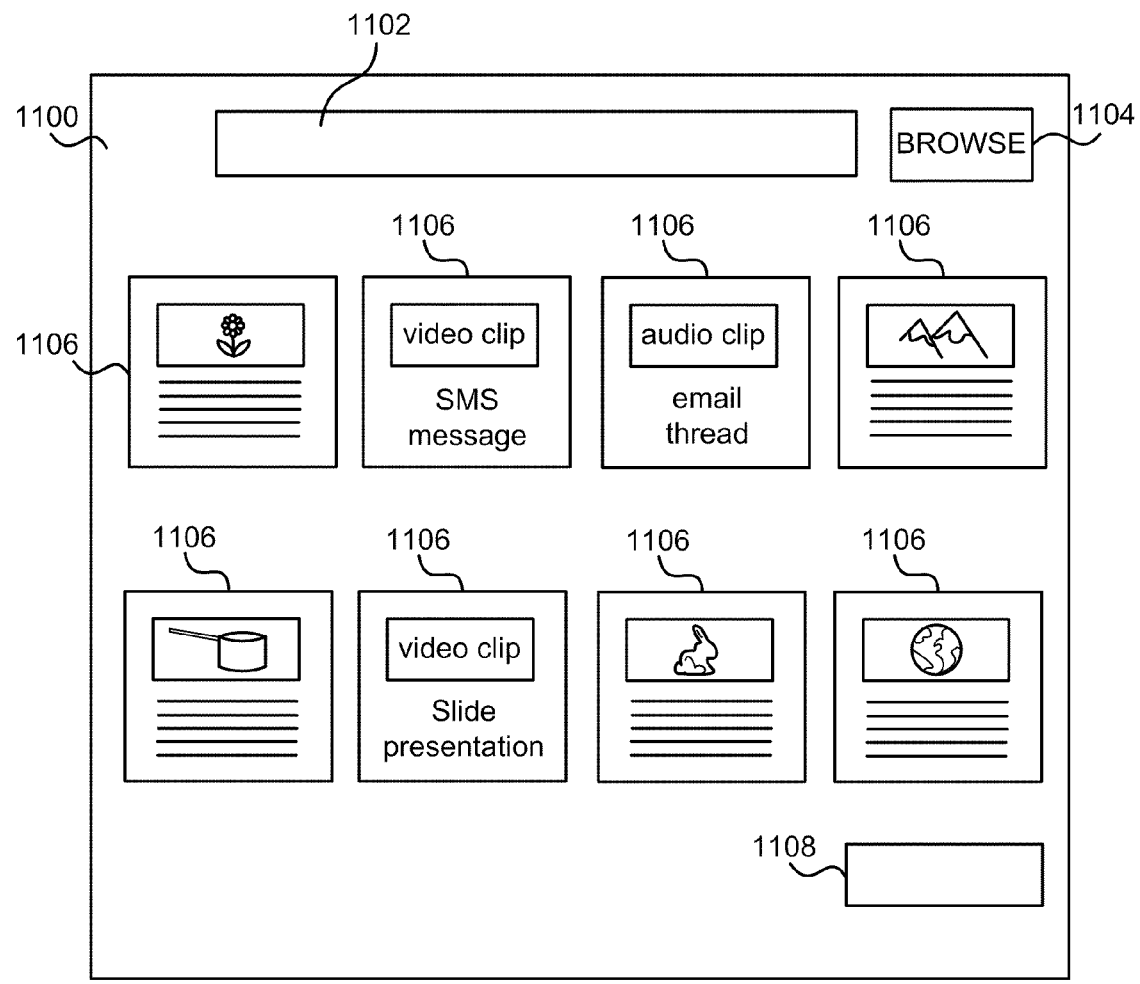
FIG. 11 is a schematic diagram of an example of a graphical user interface (GUI) displaying composite items formed from a plurality of content items of different media types.

FIG. 11 is a schematic diagram of an example of a GUI displaying composite items formed from a variety of different content. As described above in FIG. 6 GUI 1100 comprises a text entry box 1102 into which the user can input gathering terms and a "browse" button 1104. A plurality of composite items 1106 are displayed at the GUI 1100. GUI 1100 may comprise any other appropriate icons or functions. The composite items 1106 may be formed from images and text or any other appropriate content. In the example shown in FIG. 11 at least one of the composite items is formed from a video clip and an SMS message. For example at least one of the composite items is formed from an audio clip and an email thread and at least one further item is formed from a video clip and a slide presentation. The composite items may be formed from media items in any of the above formats or any other appropriate format.

The GUI may also comprise additional buttons or icons 1108 to allow access to additional functions. The features of the GUI of FIG. 11 are as described above with reference to FIG. 6.

Figure 12:
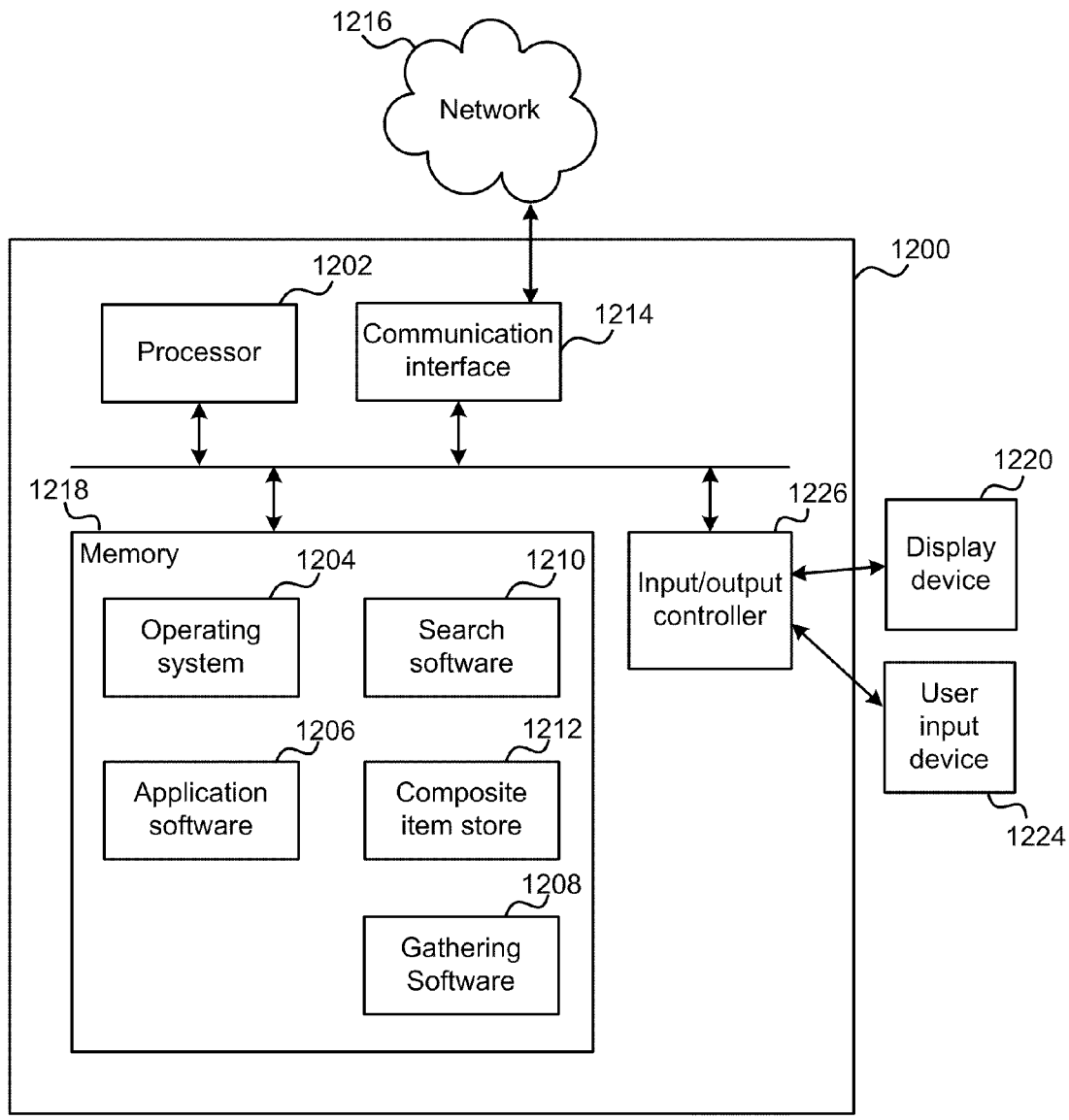
FIG. 12 illustrates an exemplary computing-based device in which examples of an information exploration system may be implemented.

FIG. 12 illustrates various components of an exemplary computing-based device 1200 which may be implemented as any form of a computing and/or electronic device, and in which examples of an information exploration system and/or a gathering engine may be implemented.

Computing-based device 1200 comprises one or more processors 1202 which may be microprocessors, controllers or any other suitable type of processors for processing computing executable instructions to control the operation of the device in order to execute an information exploration system. Platform software comprising an operating system 1204 or any other suitable platform software may be provided at the computing-based device to enable application software 1206 to be executed on the device. The software may further comprise gathering engine software 1208, search software 1210 and a composite item store 1212. Any one or more of the gathering software 1208, search software 1210 and composite item store 1212 may be situated locally on the user machine or may be accessed using communication interface 1214 from a remote location on a network.

The computer executable instructions may be provided using any computer-readable media, such as memory 1118. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1200 it will be appreciated that the storage may be distributed or located remotely and accessed via a network or other communication link (e.g. using communication interface 1214).

The computing-based device 1200 also comprises an input/output controller 1220 arranged to output display information to a display device 1222 which may be separate from or integral to the computing-based device 1200. The display information may provide a graphical user interface. The input/output controller 1220 is also arranged to receive and process input from one or more devices, such as a user input device 1224 (e.g. a mouse or a keyboard). This user input may be used to input gathering terms, manipulate composite items and carry out other operations requiring user input. In an example the display device 1222 may also act as the user input device 1224 if it is a touch sensitive display device. The input/output controller 1220 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred example is given by way of example only and that various modifications may be made by those skilled in the art. The above specification, examples and data provide a complete description of the structure and use of exemplary examples of the invention. Although various examples of the invention have been described above with a certain degree of particularity, or with reference to one or more individual examples, those skilled in the art could make numerous alterations to the disclosed examples without departing from the spirit or scope of this invention.

The invention claimed is:

1. A method at an information exploration system comprising:
creating a plurality of composite items to be presented on a user interface, the composite items comprising content of at least two different media types;
receiving a plurality of gathering terms and repeatedly using one or more of the gathering terms to generate the composite items, each composite item being generated by:
generating a first query from at least one of the gathering terms;
submitting the first query to a search engine and obtaining at least one search result of a first media type;
obtaining a first content associated with the at least one search result of the first media type, the first content being of the first media type;
generating a second query from the obtained first content;
submitting the second query to the search engine and obtaining at least one search result of a second media type;
obtaining a second content associated with the at least one search result of the second media type, the second content being of the second media type; and
creating a composite item from the first and second content;
receiving a user input selecting content in one of the composite items;
identifying the search result used to obtain the selected content; and
causing display of further content using the identified search result.

2. A method as claimed in claim 1 which further comprises, for the composite item:
obtaining the gathering terms used to generate the composite item;
modifying the gathering terms using at least a portion of the first and second content from the composite item;
using the modified gathering terms to generate a second plurality of composite items; and displaying the second plurality of composite items simultaneously at the user interface.

3. A method as claimed in claim 2 wherein the modifying the gathering terms comprises adding content from the composite item.

4. A method as claimed in claim 1 which further comprises, for the composite item:
obtaining the gathering terms used to generate the composite item;
modifying the gathering terms by replacing them with at least a portion of the first and second content from the composite item; and
using the modified gathering terms to generate a second plurality of composite items; and displaying the second plurality of composite items simultaneously at the user interface.

5. A method as claimed in claim 1 which further comprises storing each created composite item together with the gathering terms used to create each composite item and together with the search results of the first and second media types used to create each composite item.

6. A method as claimed in claim 1 wherein the at least one search result of the first media type comprises a description of a web page and further comprising using the description of the web page as the first content.

7. A method as claimed in claim 1 wherein the generating the first and second queries comprises adding a search bias term.

8. A method as claimed in claim 1 which further comprises receiving a user input specifying one of the composite items and specifying a destination and sending the specified composite item to the specified destination, the specified destination including at least one of a printer, an email, a digital photo frame, an online photo-sharing application, or a digital scrapbook.

9. A method as claimed in claim 1 wherein the search engine comprises a plurality of independent search engines each independent search engine being configured to retrieve search results of a different media type.

10. A method as claimed in claim 1 wherein one of the obtaining the at least one search result of the first media type or the obtaining the at least one search result of the second media type comprises filtering search results received from the search engine to select only those of a specified media type.

11. A method as claimed in claim 1 wherein the generating the first and second queries comprises adding gathering terms to ensure that only search results of a specified media type are retrieved.

12. A method as claimed in claim 1 wherein the first and second media types are selected from any combination of: document, web page, email, email thread, SMS message, video, image, text, audio file, voice mail, blog, book, audio book, and SMS message feed.

13. A method as claimed in claim 1 wherein the obtaining the at least one search result of the first media type and the obtaining the at least one search result of the second media type comprises checking whether the search results of the first and second media types provide downloadable content.

14. A gathering engine to create a plurality of composite items and display the composite items at a user interface, the composite items comprising content of at least two different media types, the gathering engine comprising:
an input to receive a plurality of gathering terms; and
a processor to repeatedly use one or more of the gathering terms to generate the composite items;
the processor being further configured to:
generate a first query from at least one of the gathering terms;
submit the first query to a search engine and obtain at least one search result of a first media type;
obtain a first content associated with the at least one search result of the first media type, the first content being of the first media type;
generate a second query from the obtained first content;
submit the second query to the search engine and obtain at least one search result of a second media type;
obtain a second content associated with the at least one search result of the second media type, the second content being of the second media type; and
create a composite item from the first and second content;
the input further configured to receive a user input selecting content in one of the composite items;
the processor further configured to download further content from which the selected content was obtained.

15. A gathering engine as claimed in claim 14 wherein the processor is further configured, for the composite item, to:
obtain the gathering terms used to generate the composite item;

modify the gathering terms using at least a portion of the first and second content from the composite item;

use the modified gathering terms to generate a second plurality of composite items; and display the second plurality of composite items simultaneously at the user interface.

16. A gathering engine as claimed in claim 14 wherein the processor is further configured, for the composite item, to:

obtain the gathering terms used to generate the composite item;

modify the gathering terms by replacing them with at least a portion of the first and second content from the composite item; and use the modified gathering terms to generate a second plurality of composite items; and display the second plurality of composite items simultaneously at the user interface.

17. An information exploration system comprising a search engine and a gathering engine, the gathering engine configured to create a plurality of composite items to be presented on a user interface, the composite items comprising content of at least two different media types, the gathering engine comprising:

an input to receive a plurality of gathering terms; and a processor to repeatedly use one or more of the gathering terms to generate the composite items;

the processor being further configured to:

generate a first query from at least one of the gathering terms;

submit the first query to the search engine and obtain at least one search result of a first media type;

obtain a first content associated with the at least one search result of the first media type, the first content being of the first media type;

generate a second query from the obtained first content;

submit the second query to the search engine and obtain at least one search result of a second media type; and obtain a second content associated with the at least one search result of the second media type, the second content being of the second media type;

the input further configured to receive a user input selecting content in a composite item;

the processor further configured to identify the search result used to obtain the selected content and to provide an option to download or display further content using the identified search result.

18. An information exploration system as claimed in claim 17 wherein the processor is further configured, for the composite item, to:

obtain the gathering terms used to generate the composite item;

modify the gathering terms using at least a portion of the first and second content from the composite item;

use the modified gathering terms to generate a second plurality of composite items; and display the second plurality of composite items simultaneously at the user interface.

19. An information exploration system as claimed in claim 17 wherein the processor is further configured, for the composite item, to:

obtain the gathering terms used to generate the composite item;

modify the gathering terms by replacing them with at least a portion of the first and second content from the composite item; and use the modified gathering terms to generate a second plurality of composite items; and display the second plurality of composite items simultaneously at the user interface.

* * * * *

UNITED STATES PATENT AND TRADEMARK OFFICE
CERTIFICATE OF CORRECTION

| | | |
|---|---|---|
| PATENT NO. | : 8,458,180 B2 | Page 1 of 1 |
| APPLICATION NO. | : 12/771140 | |
| DATED | : June 4, 2013 | |
| INVENTOR(S) | : Gossel et al. | |

It is certified that error appears in the above-identified patent and that said Letters Patent is hereby corrected as shown below:

In the Specification

Column 6, line 58, delete "grepping," and insert -- gripping, --, therefor.

Column 7, line 10, delete "by" and insert -- be --, therefor.

Signed and Sealed this
Third Day of February, 2015

Michelle K. Lee
*Deputy Director of the United States Patent and Trademark Office*